(12) United States Patent
Greinwald

(10) Patent No.: US 8,074,977 B2
(45) Date of Patent: Dec. 13, 2011

(54) APPARATUS FOR PROCESSING FLAT PARTS AND METHOD

(75) Inventor: Kurt Greinwald, Uberlingen (DE)

(73) Assignee: Atlantic Zeiser GmbH (DE)

( * ) Notice: Subject to any disclaimer, the term of this patent is extended or adjusted under 35 U.S.C. 154(b) by 476 days.

(21) Appl. No.: 12/132,425

(22) Filed: Jun. 3, 2008

(65) Prior Publication Data

US 2008/0298937 A1  Dec. 4, 2008

Related U.S. Application Data

(60) Provisional application No. 60/941,881, filed on Jun. 4, 2007.

(51) Int. Cl.
*B65H 9/06* (2006.01)

(52) U.S. Cl. .............. 271/13; 414/797.6; 271/10.06; 271/251

(58) Field of Classification Search .............. 271/13, 271/10.06, 10.07, 251, 4.05, 4.06, 5, 6; 414/797.2, 414/797.6
See application file for complete search history.

(56) References Cited

U.S. PATENT DOCUMENTS

| | | | |
|---|---|---|---|
| 1,618,625 A * | 2/1927 | Aldrich | 271/251 |
| 2,205,921 A * | 6/1940 | Clarke | 271/13 |
| 2,249,505 A * | 7/1941 | Davidson | 271/13 |
| 3,934,868 A * | 1/1976 | Selak | 271/9.12 |
| 4,174,339 A * | 11/1979 | Matsuda et al. | 523/177 |
| 4,236,708 A * | 12/1980 | Matsuo | 271/12 |
| 5,096,179 A * | 3/1992 | Schmitt | 271/9.03 |
| 5,224,696 A * | 7/1993 | Kellum, III | 271/184 |
| 5,836,582 A * | 11/1998 | Ogawa et al. | 271/12 |
| 6,418,847 B1 * | 7/2002 | Holecek | 101/232 |
| 6,607,193 B2 * | 8/2003 | Nordling et al. | 271/99 |
| 7,300,051 B1 * | 11/2007 | Rieschick | 271/188 |

FOREIGN PATENT DOCUMENTS

| | | |
|---|---|---|
| DE | 41 09 338 A1 | 9/1991 |
| DE | 41 09 339 A1 | 9/1991 |
| DE | 198 14 141 A1 | 10/1999 |
| DE | 102 05 488 A1 | 8/2003 |

OTHER PUBLICATIONS

German Office Action.

* cited by examiner

*Primary Examiner* — Mark A Deuble
(74) *Attorney, Agent, or Firm* — Henry B. Ward, III; Moore & Van Allen, PLLC

(57) ABSTRACT

An apparatus for processing flat parts, in particular plastic substrates, preferably plastic cards, having a store containing the parts to be processed, at least one processing device defining a processing section and a transport device for transporting the parts over the processing section is characterized in that, before the processing device, a feed device extending over a feed section is provided, and in that the feed device comprises aligning means for aligning the parts over the feed section. A suitable method has appropriate method steps.

19 Claims, 3 Drawing Sheets

APPARATUS FOR PROCESSING FLAT PARTS AND METHOD

CROSS REFERENCE TO RELATED APPLICATIONS

This application claims benefit of priority under 35 U.S.C. §119(e) to the filing date of U.S. Provisional Application No. 60/941,881, as filed on Jun. 4, 2007, which is incorporated herein by reference in its entirety.

FIELD OF INVENTION

The invention relates to an apparatus for processing flat parts, in particular plastic substrates, preferably plastic cards, having a store containing the parts to be processed, at least one processing device defining a processing section and a transport device for transporting the parts over the processing section. Furthermore, the invention relates to a corresponding method.

BACKGROUND

The processing of plastic cards very frequently concerns the application of paint, a magnetic strip or other identification and security features. Merely by way of example, reference should be made in this respect to bank cards, credit cards, telephone cards, identity cards, cards as access authorization, gift cards with a storable credit, etc.

The processing of plastic cards is problematical in as much as the production process has to be carried out at high speeds. For example, in the overall process, speeds of 0.4 m/sec and more are not infrequently achieved, which means that it is possible to process or print up to 6000 parts or cards per hour.

However, apparatuses known hitherto in practice for processing corresponding cards have considerable problems in relation to precision, which can frequently be traced back to a positioning accuracy of the card which cannot always be reproduced. During the transport of the cards, excessively high speed fluctuations of the conveying device occur, with simultaneous inaccurate positioning. In addition, the respective position of the card cannot be registered sufficiently quickly or even cannot be registered at all. In addition, the cards are regularly positioned before the first processing station and after that are conveyed through all the stations on a suction belt. Subsequent alignment, in particular following unintentional displacement of the card, is not possible.

SUMMARY OF THE INVENTION

The present invention is therefore based on the object of configuring and developing an apparatus and a method of the generic type in such a way that highly precise processing with exact positioning of the part is possible.

In accordance with the features of patent Claim 1, the apparatus according to the invention is characterized in that, before the processing device, a feed device extending over a feed section is provided, and in that the feed device comprises aligning means for aligning the parts, at least over a region of the feed section.

According to the invention, it has been recognized that positioning once before the first processing, irrespective of the number of processing stations, is inadequate. Thus, in a manner according to the invention, a feed device is provided before the processing device, that is to say in the case of a plurality of processing devices, accordingly before each processing device. The feed device comprises aligning means for aligning the parts over the feed section.

In other words, in a manner according to the invention, an apparatus is implemented in which a special feed device is connected upstream of each processing device. This means that the part or the card is positioned over the feed section before being fed or transferred to the respective processing device, the positioning being carried out by aligning means for aligning the parts.

Irrespective of the respective position of the part to be processed after processing, the part is repositioned over the feed section there before the following processing device. Thus, to this extent the accuracy of the positioning in the preceding processing device plays a part which is at most subordinate, specifically exclusively in relation to the preceding processing process.

At this point, it should be pointed out quite particularly once more that the processing device is to be understood as a modular unit operating autonomously. For example, the processing device can comprise a printer for printing the part or the card or a device for applying a magnetic strip or the like. Any types of processing of a card are conceivable in the respective processing devices.

As already mentioned previously, a store having the parts or cards to be processed is connected upstream of the processing device. A feed device is provided between the store and the first processing device, which feed device comprises appropriate aligning means for aligning the parts.

If at least two processing devices that are constructionally different from each other are provided, a feed device having appropriate aligning means is provided between the processing devices and thus, in the light of the preceding explanations, before each processing device. As a result of this measure, the processing devices can be understood as autonomous modular units, to which the parts to be processed are fed in an exactly positioned manner, irrespective of the preceding processing device.

In practical terms, the feed device comprises a type of feed table having feed means, such as a conveyor system, running thereon. Thus, the part or the card is conveyed over the feed table, the feed table advantageously being a device which comprises a feed surface preferably fabricated from metal, preferably from stainless steel.

The feed means used for the feeding are constructed in a quite particularly advantageous way as tapes, belts or the like spaced apart from one another and preferably arranged in parallel, which run around the feed table, preferably endlessly over rollers at the ends. The feed means can be spaced apart slightly from the feed surface, namely by means of appropriate dimensioning of the rollers at the ends. Likewise, it is conceivable for the feed means to rest directly on the feed surface and to be guided along the surface. It is important in any case that the feed means can be tapes, belts or the like, for example, which run synchronously.

The tapes used for the conveyance can have a thickness in the range from about 1 mm to 5 mm. Different cross sections are conceivable. For example, the tapes, belts or the like can have a round, oval or flattened cross section, as needed. As a result, in relation to the parts to be conveyed, given appropriate configuration of the tapes or belts, a flat support or a linear support of the parts can be generated, which can be to the benefit of the ability to align the parts on the tapes or belts.

Furthermore, it is advantageous if the tapes, belts or the like are constructed so as to be at least largely stretch-resistant. For example, the tapes, belts or the like can comprise a metal braid or else a stretch-resistant plastic, for example likewise in the form of a braid. Furthermore, it is advantageous if the feed means are rubber covered on the surface or otherwise configured so as to inhibit slipping, in any case on their upper side, so that the parts to be conveyed can be positioned reliably.

Furthermore, it is advantageous if the feed means are dimensioned in such a way and spaced apart from one another in such a way that the parts positioned thereon can be conveyed over the feed table at least at a slight distance from the latter, specifically without touching the feed table directly.

In a quite particularly advantageous way, the feed table is equipped with a type of suction device; specifically openings are provided over the feed section for taking in air and thus for attracting the respective parts or cards by suction. In a further advantageous way, the attraction by suction is provided via an adjustable vacuum, which holds the parts in the respective position on the tapes or belts but permits displacement of the parts on the feed means with the action of only little force. Consequently, positioning of the parts is even possible during the conveyance, without damaging the parts to be conveyed or marking them unintentionally. The openings via which the vacuum is generated are preferably formed equidistantly from one another.

As already mentioned previously, the feed device has special aligning means for aligning the parts over the feed section, at least over a region of the feed section. These aligning means include a guide strip on one side of the feed table, arranged on or beside the feed table and preferably extending over the entire feed section. The parts are aligned and conveyed in a corresponding way along the guide strip. As a result of conveying the parts along the guide strip, the parts are aligned, specifically with their at least one straight edge. Thus, this edge is used in interaction with the guide strip for the purpose of alignment, the movement of the parts being generated by the aligning means.

The aligning of the parts can be implemented quite particularly simply by a simple measure, specifically by the feed means being conveyed at least slightly toward the guide strip, so that the part comes into lateral contact with the guide strip over the feed section. Since the part does not rest directly on the feed table and thus the attraction by suction of the suction device can be overcome with the expenditure of little force, the part can be positioned in contact with the guide strip over the feed section, the part sliding along the guide strip, positioned on the aligning means and tapes or belts.

The guide strip itself is equipped with adjusting means for its adjustment. Any desired conventional means, for example setting screws or the like, can be used in this case.

At the end of the feed device, a transfer station is provided for the accurately positioned transfer of the parts aligned over the feed section to or onto the transport device of the following processing station. The transport device can comprise a conventional suction belt. In this case, it is important that the part positioned exactly over the feed device or feed section is transferred in an accurately positioned manner to the transport device or conveyed onto the latter, the part being held in its position on the transport device or on the suction belt there.

From the point of view of the method, the above object is achieved by the features of the coordinated patent Claim 19. The latter specifies a method for processing flat parts, in particular for processing plastic substrates, preferably plastic cards, comprising a store containing the parts to be processed, at least one processing device defining a processing section and a transport device for transporting the parts over the processing section. The method is preferably employed to utilize the apparatus according to the invention. According to the invention, the method is characterized in that the parts are aligned before the processing device. This means that, before each processing device, appropriate alignment and positioning of the part is carried out. The alignment is carried out over a feed section by special aligning means.

Furthermore, it should be noted that the alignment can be carried out in an identical way before each processing station. It is likewise conceivable for a type of repositioning of the part to be carried out or alignment before each workstation in accordance with the respective requirement of the following processing.

BRIEF DESCRIPTION OF THE SEVERAL VIEWS OF THE DRAWINGS

There are now various possible ways of refining and developing the teaching of the present invention in an advantageous way. To this end, reference should be made firstly to the patent claims arranged after patent Claims 1 and 19 and secondly to the following explanation of an exemplary embodiment of the invention, using the drawing. In conjunction with the explanation of the preferred exemplary embodiment of the invention, using the drawing, refinements and developments of the teaching which are generally preferred will also be explained. In the drawing:

DETAILED DESCRIPTION OF THE INVENTION

Figure 1:
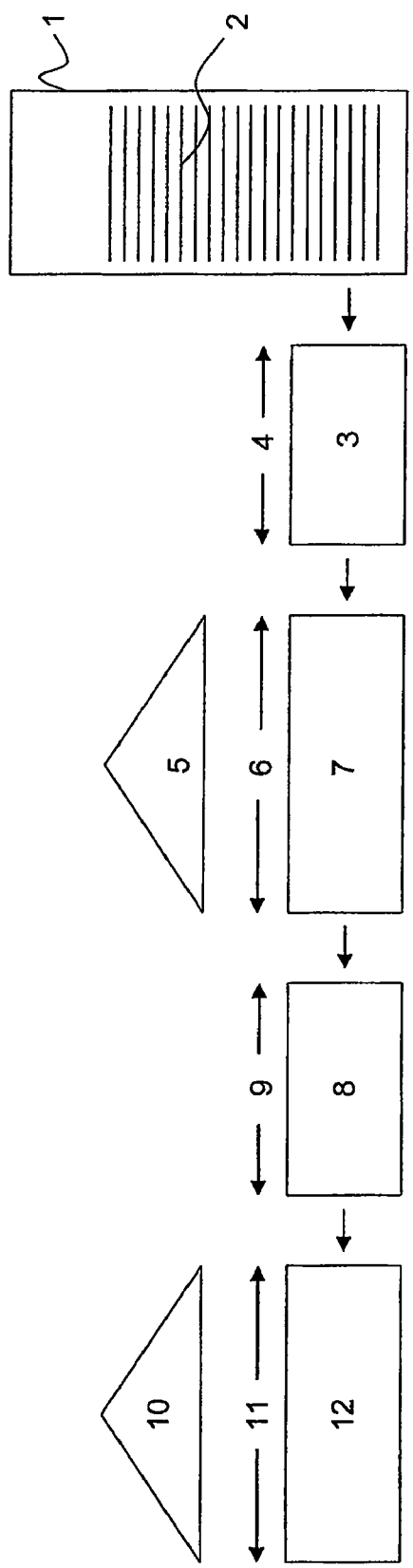
FIG. 1 shows a schematic view of the basic structure of an apparatus according to the invention having two processing devices.

FIG. 1 shows a schematic illustration of an exemplary embodiment of an apparatus according to the invention for processing flat parts, this being an apparatus which comprises a processing device for printing a card and a processing device for applying a magnetic strip or magnetic layer to the card. Details in relation to actual processes and/or in relation to the card do not play any part here, so that it is possible at this point to dispense with the illustration of practical processing possibilities, for example for the production of credit cards, and with the illustration of actual cards.

According to the illustration in FIG. 1, the apparatus comprises a store 1, from which cards 2 to be processed are provided. The cards 2 pass over a first feed device 3 and in a corresponding way over a feed section 4 to a first processing device 5, which comprises a transport device 7 extending over a processing section 6.

The first processing device 5 or the transport device 7 is followed by a second feed device 8, which in turn extends over a feed section 9. The second feed device 8 is followed by a second processing device 10 over an appropriate processing section 11, which is defined by a transport device 12.

According to the invention, a feed device 3, 8 is provided before each processing device 5, 10, the feed devices 3, 8 comprising special aligning means, such as an aligning system 13, for aligning the parts or cards 2 over the respective feed section 4, 9. To this extent, reference should be made to FIGS. 2 and 3.

Figure 2:
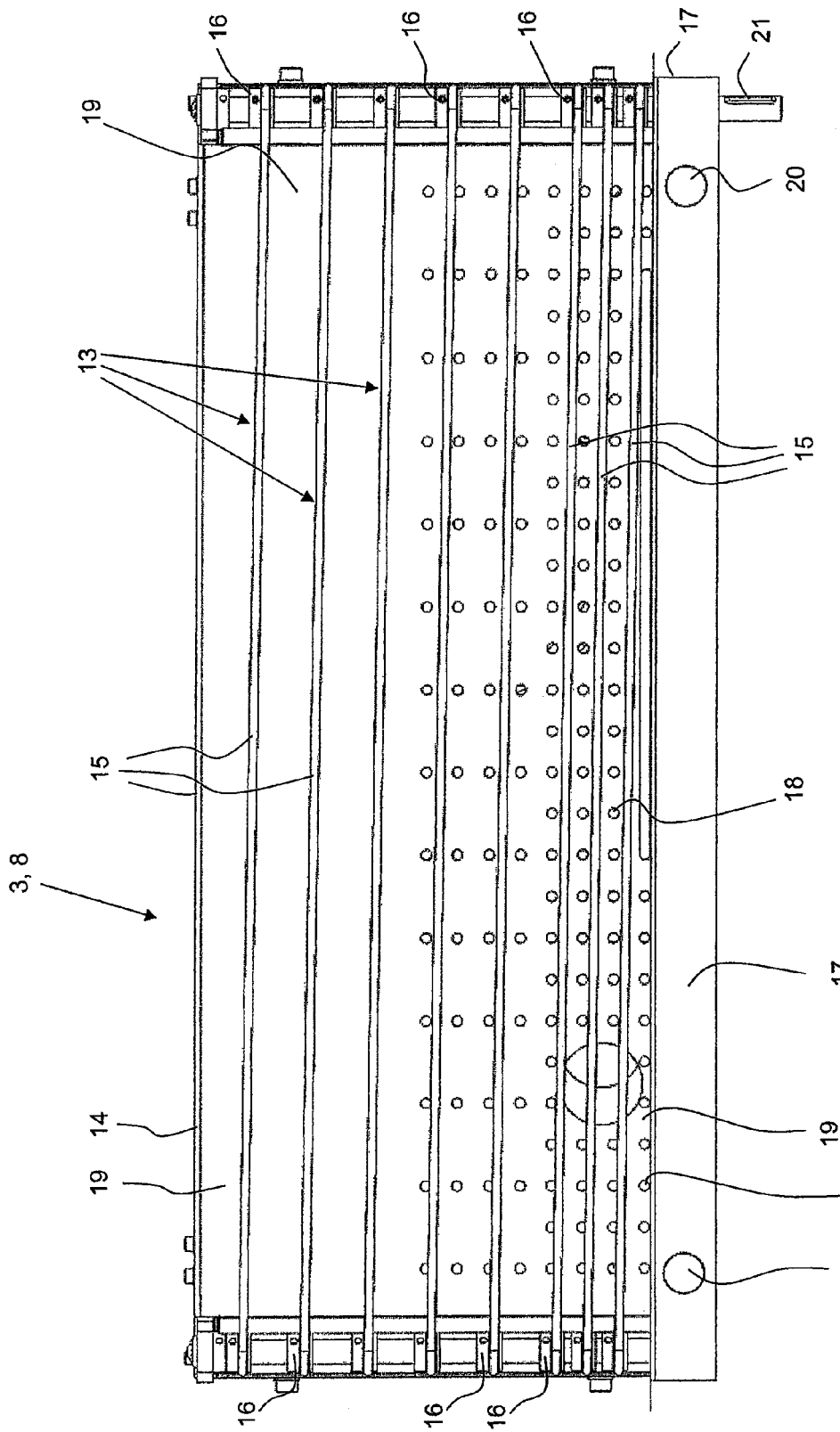
FIG. 2 shows a schematic plan view of an exemplary embodiment of a feed device.

According to the plan view from FIG. 2, the aligning system 13 is arranged on a feed table 14 belonging to the feed device 3, 8. The aligning system 13 comprises tapes 15 running endlessly over the feed table 14, which are used to support the cards 2, not shown in FIG. 2. It should be appreciated that tape is understood to include any type of conveying device, such as a belt. The tapes 15 run over rollers 16 at the ends, which are driven synchronously via a common shaft. Arranged on one side of the feed table 14 is a guide strip 17, the tapes 15 running obliquely or inclined at an acute angle to the guide strip 17. This arrangement of the tapes 15 leads to cards placed on the tapes 15 being conveying or "wandering" laterally toward the guide strip 17 and being aligned there with their edge on the guide strip 17. Simple alignment of the cards is implemented as a result.

Furthermore, the feed table 14 is equipped with a vacuum system or with a suction system. To this end, the feed table 14 has suction openings 18 in the table surface 19, which attract the cards by suction in the direction of the table surface 19. However, since the cards are spaced at least slightly away from the table surface 19 on account of the provision of the tapes 15, the action of the suction apparatus and of the vacuum is reduced. As a result, aligning the cards along the guide strip 17 is made easier, specifically displacement of the respective card can be carried out without great expenditure of force and thus without damaging the card. Thus, each card is aligned along the guide strip 17 over the feed section 4, 9, and specifically once more before each processing device 5, 10, which means that accurately positioned processing of the cards in the processing devices 5, 10 is possible.

Figure 3:
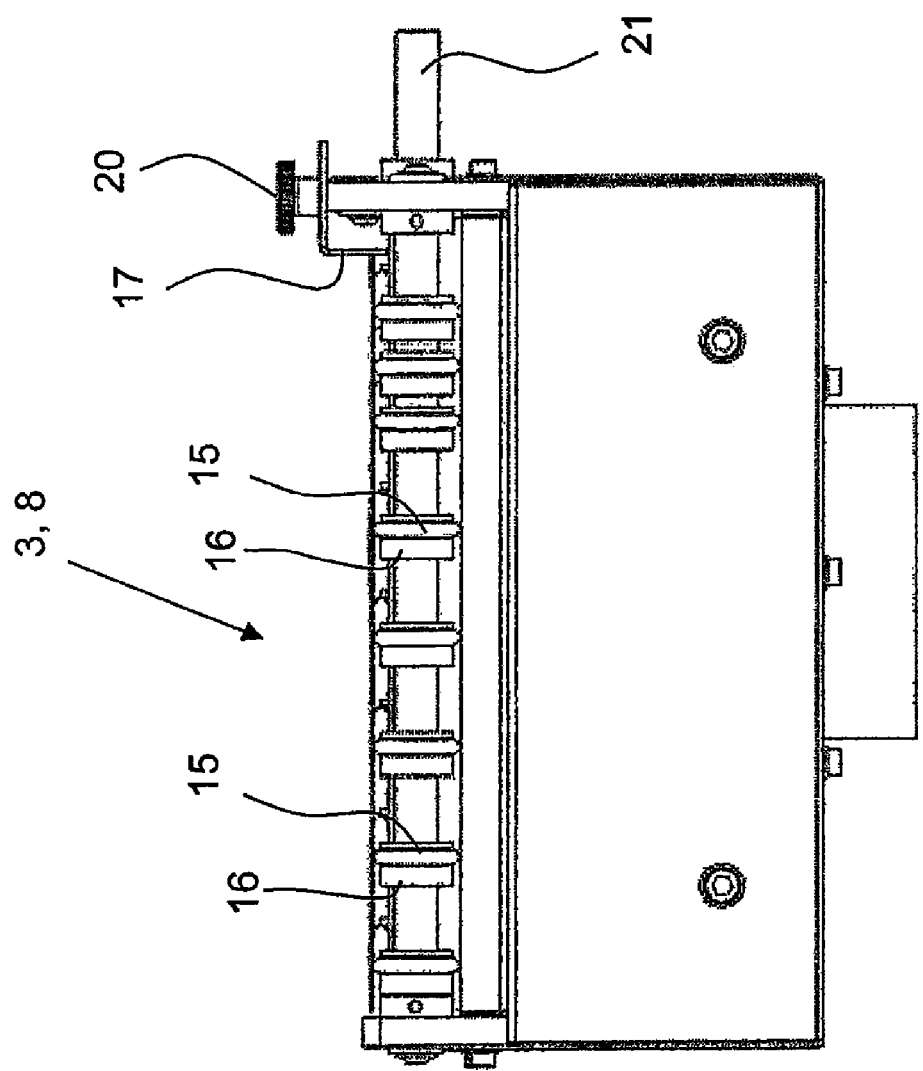
FIG. 3 shows a schematic end view of the feed device from FIG. 2.

FIG. 3 shows the feed device 3, 8 according to FIG. 2 from the end. It can be seen clearly that the guide strip 17 has an adjusting device in the form of setting screws 20. It should be appreciated that any desired conventional adjusting means can be used in this case. The rollers 16 are driven in rotation via a common shaft 21. For this purpose, the rollers 16 are seated on the shaft 21 in a rotationally fixed manner.

In relation to features which cannot be gathered from the figures, reference should be made to the general part of the description in order to avoid repetitions. Finally, it should be noted that the exemplary embodiment explained above serves to explain the teaching claimed by way of example but does not restrict said teaching to the exemplary embodiment.

What is claimed is:

1. Apparatus for processing flat parts, the apparatus comprising:
   a store containing the parts to be processed;
   at least one processing device defining a processing section;
   a feed section connected upstream of said processing device so that parts are positioned over said feed section before being transferred to the processing device;
   a feed device positioned over at least a region of said feed section, said feed device comprising a feed table having a conveyor system running thereon, said conveyor system defining a conveyor surface spaced apart from the surface of said feed table, and wherein said feed table comprises a plurality of openings formed in said feed section for taking in air and thus for attracting the parts by suction onto said conveyor surface, and wherein said conveyor system comprises a plurality of tapes spaced apart from one another and arranged in parallel, wherein said tapes run around said feed table; and
   a transport device for transporting the parts over said processing section,
   wherein said feed device comprises an aligning system for aligning the parts over said region of said feed section prior to the parts being transported by the transport device to said processing device.

2. Apparatus according to claim 1, wherein said feed device is provided between said store and said processing device.

3. Apparatus according to claim 1, wherein the apparatus comprises at least two processing devices that are constructionally different from each other and said feed device is provided between said processing devices.

4. Apparatus according to claim 1, wherein said feed table comprises a feed surface fabricated from metal.

5. Apparatus according to claim 1, wherein said tapes have a thickness in the range from about 1 mm to 5 mm.

6. Apparatus according to claim 1, wherein said tapes have a cross section selected from the group consisting of round, oval and flattened.

7. Apparatus according to claim 1, wherein said tapes are at least largely stretch-resistant and are configured to inhibit slipping.

8. Apparatus according to claim 1, wherein said tapes are dimensioned and spaced apart from one another so that the parts positioned thereon can be conveyed over said feed table at least at a slight distance from said feed table, without touching said feed table.

9. Apparatus according to claim 1, wherein the attraction by suction is provided via an adjustable vacuum, which holds the parts in the respective position and permits the aligning system to displace the parts so as to align the parts.

10. Apparatus according to claim 1, wherein said openings are arranged equidistantly from one another.

11. Apparatus according to claim 1, wherein said aligning system comprises a guide strip arranged proximate to said feed table and extending over said feed section, wherein the parts can be conveyed along said guide strip.

12. Apparatus according to claim 11, wherein said conveyor system conveys at least slightly toward said guide strip, so that the part comes into displaceable contact with said guide strip over said feed section.

13. Apparatus according to claim 12, wherein said guide strips comprise an adjusting device for adjustment.

14. Apparatus according to claim 1, further comprising:
   a transfer device for accurately transferring the parts aligned over the feed section to said transport device of said processing station.

15. Apparatus according to claim 14, wherein said transport device comprises a suction belt.

16. Method for processing flat parts, the method comprising:
   storing the parts to be processed;
   aligning the parts;
   processing the parts via at least one processing device that defines a processing section; and
   transporting the parts over the processing section,
   wherein the parts are aligned before being processed by the processing device and said alignment step is carried out over a feed section by an aligning system, the aligning system comprises a feed device positioned over at least a region of the feed section, the feed device comprising a feed table having a conveyor system running thereon, the conveyor system defining a conveyor surface spaced apart from the surface of the feed table, and wherein the feed table comprises a plurality of openings formed in the feed section for taking in air and thus for attracting the parts by suction onto the conveyor surface, and wherein the conveyor system comprises a plurality of tapes spaced apart from one another and arranged in parallel, wherein the tapes run around the feed table.

17. Method according to claim 16, wherein, when at least two processing devices are linked in series, said alignment step comprises aligning the parts before each of the processing devices.

18. Method according to claim 17, wherein said alignment step comprises aligning the parts in an identical way.

19. Method according to claim 17, wherein said alignment step comprises aligning the parts before each of the processing devices is carried out in accordance with the respective requirement of the positioning of the respective part.

* * * * *